(12) United States Patent
Medalion et al.

(10) Patent No.: US 11,546,133 B2
(45) Date of Patent: Jan. 3, 2023

(54) VALIDATION AS A SERVICE FOR THIRD PARTIES USING HOMOMORPHIC ENCRYPTION

(71) Applicant: Intuit Inc., Mountain View, CA (US)

(72) Inventors: Shlomi Medalion, Lod (IL); Alexander Zicharevich, Petach Tikva (IL); Yehezkel Shraga Resheff, Tel Aviv (IL); Ido Meir Mintz, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 387 days.

(21) Appl. No.: 16/836,875

(22) Filed: Mar. 31, 2020

(65) Prior Publication Data

US 2021/0306136 A1  Sep. 30, 2021

(51) Int. Cl.
| | |
|---|---|
| *H04L 9/00* | (2022.01) |
| *G06N 3/08* | (2006.01) |
| *G06N 3/04* | (2006.01) |
| *G06Q 40/02* | (2012.01) |
| *H04L 9/30* | (2006.01) |
| *G06Q 20/40* | (2012.01) |

(52) U.S. Cl.
CPC ............ *H04L 9/008* (2013.01); *G06N 3/04* (2013.01); *G06N 3/08* (2013.01); *G06Q 20/401* (2013.01); *G06Q 40/02* (2013.01); *H04L 9/30* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 2007/0033419 A1* | 2/2007 | Kocher | G11B 20/00086 713/193 |
| 2010/0210240 A1* | 8/2010 | Mahaffey | H04W 12/126 455/411 |
| 2018/0299841 A1* | 10/2018 | Appu | G06N 3/02 |

* cited by examiner

*Primary Examiner* — William J. Goodchild
(74) *Attorney, Agent, or Firm* — Paradice and Li LLP

(57) ABSTRACT

Systems and methods for validating credentials are disclosed. One example method, performed by one or more processors of a computing device associated with a neural network, includes training the neural network to infer validity information for encrypted credentials received from a credential source, wherein the validity information is inferred without decrypting the encrypted credentials, receiving a first encrypted credential from the credential source, generating an encrypted validity indicator for the first encrypted credential based on the validity information inferred by the neural network, and providing the encrypted validity indicator to the credential source.

18 Claims, 4 Drawing Sheets

VALIDATION AS A SERVICE FOR THIRD PARTIES USING HOMOMORPHIC ENCRYPTION

TECHNICAL FIELD

This disclosure relates generally to methods for operating neural networks, and specifically to operating neural networks to securely validate third party information.

DESCRIPTION OF RELATED ART

Individuals or businesses may have multiple accounts, such as savings accounts, checking accounts, payment accounts, credit accounts, and so on. Each of these accounts may have secure credentials, for example, such as an automated clearing house (ACH) number including a routing number and an account number. When a payment processor or payment service vendor receives such a secure credential from a user, it may have been incorrectly entered, for example either fraudulently or due to a typographical error. Identifying incorrectly entered credentials without exposing this sensitive information is an important consideration when processing payments and other financial transactions.

Accordingly, there is a need for identifying incorrectly entered credentials without exposing the credentials to third parties.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods and devices of this disclosure each have several innovative aspects, no single one of which is solely responsible for the desirable attributes disclosed herein.

One innovative aspect of the subject matter described in this disclosure can be implemented as a method for securely validating credentials. The method may be performed by one or more processors of a computing device and may include training a neural network to infer validity information for encrypted credentials received from a credential source, where the validity information is inferred without decrypting the encrypted credentials, receiving a first encrypted credential from the credential source, generating an encrypted validity indicator for the first encrypted credential based on the validity information inferred by the neural network, and providing the encrypted validity indicator to the credential source.

Another innovative aspect of the subject matter described in this disclosure can be implemented in a system for securely validating credentials. The system may include one or more processors, and a memory storing instructions that, when executed by the one or more processors, causes the system to perform operations including training a neural network to infer validity information for encrypted credentials received from a credential source, where the validity information is inferred without decrypting the encrypted credentials, receiving a first encrypted credential from the credential source, generating an encrypted validity indicator for the first encrypted credential based on the validity information inferred by the neural network, and providing the encrypted validity indicator to the credential source.

Another innovative aspect of the subject matter described in this disclosure can be implemented in a system for securely validating credentials. The system may include a credential source device and a secure verification device, coupled together via one or more networks. The credential source device is configured to transmit a homomorphic public key to the secure verification device via the one or more networks, encrypt a first credential using a homomorphic private key corresponding to the homomorphic public key, and transmit the encrypted first credential to the secure verification device via the one or more networks. The secure verification device is configured to receive the homomorphic public key and the encrypted first credential from the credential source device, train a neural network associated with the secure verification device to infer validity information for encrypted credentials received from the credential source, wherein the validity information is inferred without decrypting the encrypted credentials, generate an encrypted validity indicator for the encrypted first credential based on validity information inferred by the neural network, and provide the encrypted validity indicator to the credential source device via the one or more networks.

BRIEF DESCRIPTION OF THE DRAWINGS

The example implementations are illustrated by way of example and are not intended to be limited by the figures of the accompanying drawings. Like numbers reference like elements throughout the drawings and specification. Note that the relative dimensions of the following figures may not be drawn to scale.

DETAILED DESCRIPTION

Figure 1:
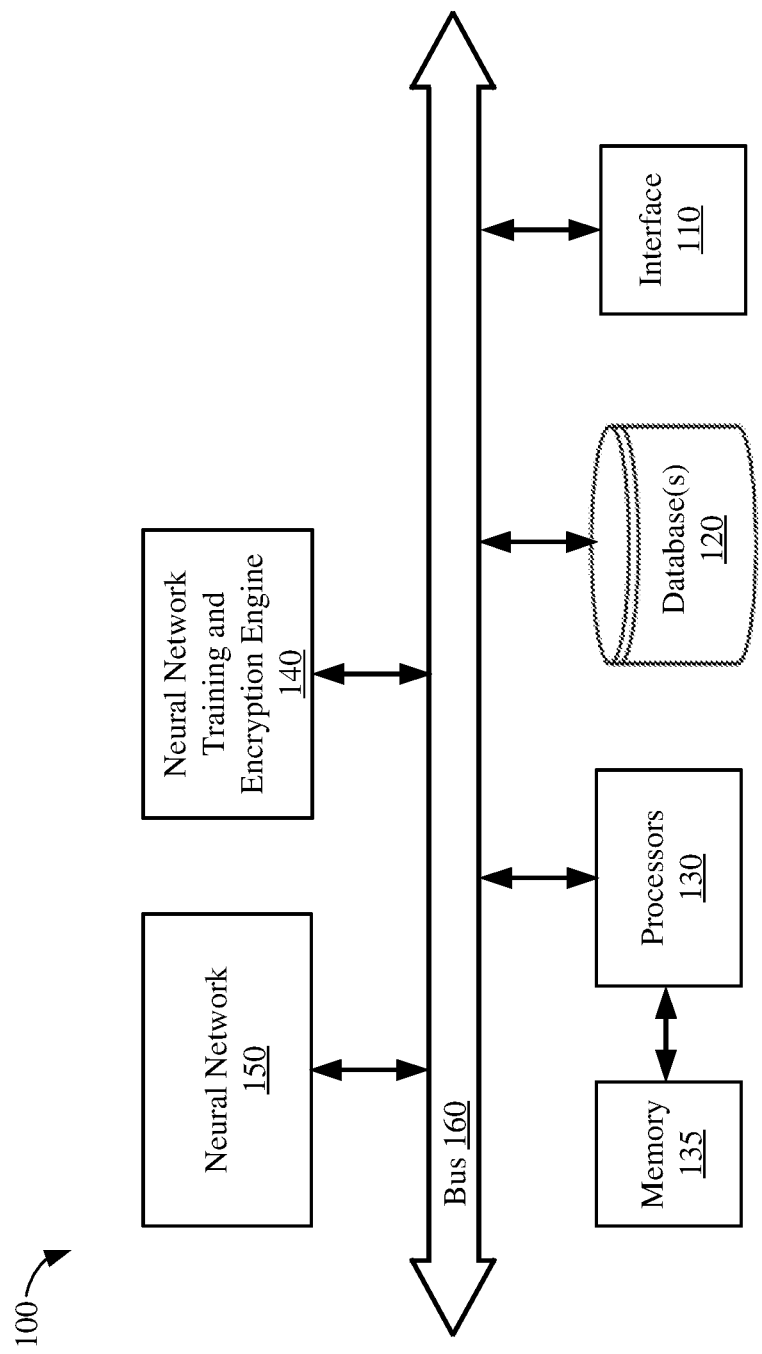
FIG. 1 shows an example secure credential validation system, according to some implementations.

Implementations of the subject matter described in this disclosure may be used to securely validate credentials using a neural network. More particularly, the example implementations may provide secure validation of such credentials without exposing unencrypted (or plaintext) credentials to potential third parties. For example payment processors may need to validate such credentials but may be unable or unwilling to allow a credential validation service provider to access the unencrypted credentials, for reasons related to security, business constraints, legal constraints, compliance constraints, and so on. The example implementations may provide such secure validation by training a neural network to infer validity indicators for unencrypted credentials, and then encrypting the trained neural network using a homomorphic public key provided by the credential source. Using homomorphic encryption may also for the example implementations to operate on encrypted data, inferring encrypted validity indicators which decrypt to a corresponding unencrypted validity indicator. Such encryption may include transforming one or more parameters, such as one or more weights of the trained neural network. The trained and encrypted neural network may then be used to determine an encrypted validity indicator for encrypted credentials. The encrypted validity indicators may be provided to the credential source, such as a payment processor, without exposing the plaintext of the unencrypted credentials. The secure credential validation may also allow the various implementations disclosed herein to not only estimate credential validity, but to do so without exposing the unencrypted credential to the credential validator. This may allow the credential validator to provide secure credential validation as a service.

Various implementations of the subject matter disclosed herein provide one or more technical solutions to the technical problem of securely validating encrypted credentials without decrypting the encrypted credentials. More specifically, various aspects of the present disclosure provide a unique computing solution to a unique computing problem that did not exist prior to electronic or online credential validation systems that can allow a credential validation service to estimate the validity of unencrypted credentials without having access to the unencrypted credentials, or even the private key with which the credentials were encrypted. As such, implementations of the subject matter disclosed herein are not an abstract idea such as organizing human activity or a mental process that can be performed in the human mind.

Moreover, various aspects of the present disclosure effect an improvement in the technical field of securely validating encrypted credentials. The training of a neural network to validate unencrypted credentials, and the encryption of the neural network to configure it to validate encrypted credentials without requiring access to the corresponding unencrypted credentials, much less the reception and transmission of such encrypted credentials and validity indicators, cannot be performed in the human mind, much less using pen and paper. In addition, implementations of the subject matter disclosed herein do far more than merely create contractual relationships, hedge risks, mitigate settlement risks, and the like, and therefore cannot be considered a fundamental economic practice.

FIG. 1 shows an example secure credential validation system 100, according to some implementations. Although described herein with respect to securely validating financial account credentials, various aspects of the secure credential validation system 100 disclosed herein may be applicable for securely verifying any appropriate credentials or sensitive information.

The secure credential validation system 100 is shown to include an input/output (I/O) interface 110, one or more database(s) 120, one or more data processors 130, a memory 135 coupled to the data processors 130, a neural network training and encryption engine 140, and a neural network 150. In some implementations, the various components of the secure credential validation system 100 may be interconnected by at least a data bus 160, as depicted in the example of FIG. 1. In other implementations, the various components of the secure credential validation system 100 may be interconnected using other suitable signal routing resources.

The interface 110 may include a screen, an input device, one or more network interfaces, and other suitable elements that allow information to be provided to the secure credential validation system 100 and/or to retrieve information from the secure credential validation system 100. Example information that can be provided to the secure credential validation system 100 may include encrypted credentials, encryption keys, such as public encryption keys, and the like. Example information that can be retrieved from the secure credential validation system 100 may include encrypted validity indicators, neural network parameters, and the like.

The database 120, which may represent any suitable number of databases, may store any suitable information pertaining to credential source encryption protocols, neural network training sets, encrypted credentials and encrypted validity indicators, and so on. For example, the information may include training data for training the neural network 150, may include encryption keys, such as public encryption keys corresponding to received encrypted credentials, may include information specifying which encryption protocol is to be used for each user, client or customer of the secure credential validation system 100, may include user/client information (such as phone numbers, email addresses, physical mailing address, SSNs, and so on), and may include related information (such as bank names, bank account numbers, and so on). In some implementations, the database 120 may be a relational database capable of presenting the information as data sets to a user in tabular form and capable of manipulating the data sets using relational operators. In some aspects, the database 120 may use Structured Query Language (SQL) for querying and maintaining the database 120.

The data processors 130, which may be used for general data processing operations (such as manipulating the data sets stored in the database 120), may be one or more suitable processors capable of executing scripts or instructions of one or more software programs stored in the secure credential validation system 100 (such as within the memory 135). The data processors 130 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 130 may be implemented as a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the data processors 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The neural network training and encryption engine 140 may be used for training the neural network 150 to infer encrypted validity indicators for encrypted input credentials, where the encrypted validity indicators and encrypted input credentials are encrypted using an encryption key, such as a public homomorphic encryption key from a credential source. Such an encrypted validity indicator may correspond to a likelihood or a probability that the corresponding encrypted input credential represents a corresponding valid unencrypted input credential. The neural network training and encryption engine 140 may identify one or more sets of training data, for example stored in database 120, for training the neural network 150. The neural network training and encryption engine 140 may then train the neural network 150 using the identified training data. The neural network training and encryption engine 140 may then encrypt the trained neural network 150, that is, by transforming a set of neural network parameters, such as a set of weights, using a specified encryption key, such as a specified public homomorphic encryption key. After training and encryption, the trained and encrypted neural network 150 may infer encrypted validity indicators corresponding to encrypted credential inputs.

The neural network 150 may store any number of machine learning models that can be used to securely validate encrypted credentials once trained and encrypted using neural network training and encryption engine 140. A machine learning model can take the form of an extensible data structure that can be used to represent sets of words or phrases and/or can be used to represent sets of attributes or features. The machine learning models may be seeded with training data for determining whether or not a received unencrypted credential is likely to be a valid credential. The neural network 150 may be a deep neural network (DNN), which may have any suitable architecture, such as a feed-forward architecture or a recurrent architecture.

The particular architecture of the secure credential validation system 100 shown in FIG. 1 is but one example of a variety of different architectures within which aspects of the present disclosure may be implemented. For example, in other implementations, the secure credential validation system 100 may not include a neural network training and encryption engine 140, the functions of which may be implemented by the data processors 130 executing corresponding instructions or scripts stored in the memory 135. Similarly, the functions of the neural network 150 may be performed by the data processors 130 executing corresponding instructions or scripts stored in the memory 135.

Figure 2:
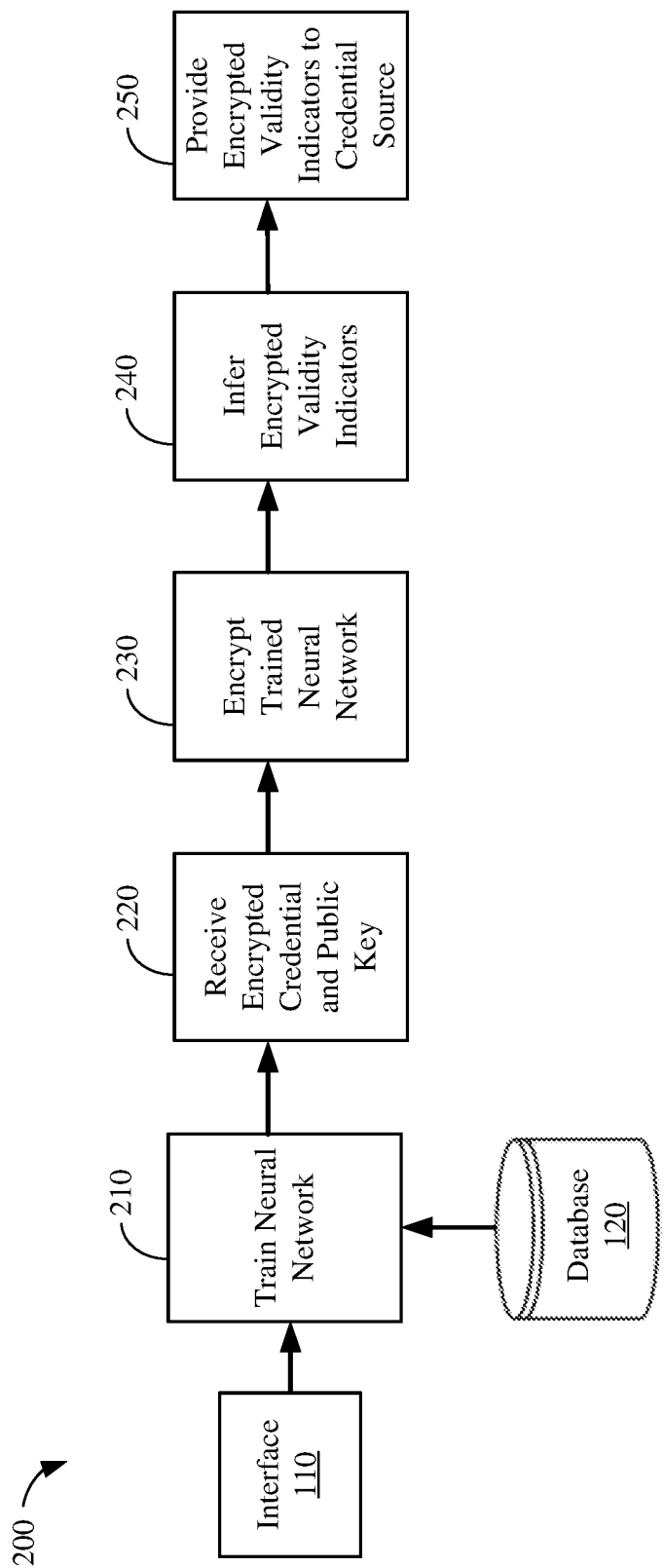
FIG. 2 shows an example process flow that may be employed by the secure credential validation system of FIG. 1, according to some implementations.

FIG. 2 shows a high-level overview of an example process flow 200 that may be employed by the secure credential validation system 100 of FIG. 1. At block 210, the neural network 150 may be trained using an identified set of training data from the database 120. The neural network may be trained to determine validity indicators for unencrypted credentials. In block 220, a public encryption key, such as a homomorphic public encryption key, and one or more encrypted credentials are retrieved via the interface 110 from a credential source (not shown for simplicity). At block 230, the trained neural network 150 may be encrypted using the received public encryption key. After encryption, the trained neural network 150 is configured to determine encrypted validity indicators for encrypted credentials. At block 240, one or more encrypted validity indicators are inferred, each encrypted validity indicator corresponding to one of the one or more encrypted credentials received at block 210. At block 250, encrypted validity indicators are provided to the credential source. For example, the one or more encrypted validity indicators may be provided to the credential source via the interface 110, such as via one or more networks.

Note that while the process flow 200 reflects the neural network being trained and then encrypted using the received public encryption key, in some other implementations the public encryption key may be received prior to training the neural network, each element of the set of training data may be encrypted using the public encryption key, and then the neural network may be trained using the encrypted set of training data. That is, rather than training on unencrypted training data, in some implementations the neural network may be trained using a encrypted set of training data.

As discussed above, a financial service provider, such as a payment processor, may need to determine the accuracy of credentials, such as user credentials. Example credentials may include bank account information, such as automated clearing house or "ACH" numbers, other savings or checking account information, or other sensitive personal financial information. Financial service providers may have a need to determine the accuracy of such credentials, to ensure that a user has not entered an incorrect credential, for example through a typographical error or the like, through an error in credential aggregation, or through attempted fraud. For example, a wrongly entered credential may not be detected immediately, and may delay detection and completion of transactions. In one example, the credential may be an ACH number, and an incorrectly entered ACH number may not be detected until after it has been submitted for processing. Discovering the incorrectly entered ACH number may take hours or days, and may delay transactions, and frustrate would-be customers of the financial service provider. Accordingly, it would be advantageous to allow a financial service provider to estimate the accuracy of entered credentials before they are submitted for processing. For example, it would be advantageous to estimate the accuracy of a credential immediately or otherwise shortly after the credential has been entered, for example in a text or other field.

Further, financial service providers may benefit from allowing a third party validator to perform credential validation. For example, the financial service provider may not need to expend the financial, computational, technical, or other resources needed to build and operate their own service for credential validation. However, allowing such a third party to perform credential validation may expose the credentials, or other personally identifiable information (PII) to the third party or to potential attackers disposed between the financial service provider and the third party. For example, legal, contractual, business, compliance, or other concerns may prevent financial service providers from employing third parties for credential validation and may discourage the use of such third party validation services. It would therefore be desirable to enable a third party to perform credential validation for such financial service providers without exposing the credentials or other PII to potential attackers.

Accordingly, the example implementations allow for secure credential validation without exposing the credentials or other PII by enabling validation to be performed on encrypted credentials. More particularly, example implementations may allow a neural network to be trained to determine credential validity indicators for unencrypted credentials. The trained neural network may then be encrypted based on an encryption protocol used for encrypting the credentials. For example, the encryption protocol may be a homomorphic encryption protocol, and encrypting the neural network may include transforming a set of weights or parameters of the trained neural network using a homomorphic public key. The encrypted and trained neural network is thus configured for determining encrypted validity indicators corresponding to input encrypted credentials. Thus, the encrypted validity indicators may be determined without the secure validation system having access to the unencrypted credentials, thus protecting the unencrypted credentials from exposure.

As discussed above, in some implementations the credentials may be ACH numbers including a routing number and an account number. The routing number represents the bank, the bank branch, and the bank location where the account was opened, while the account number may range between 4 and 17 digits, which may include a number of leading zeros which are not considered part of the account number when processing ACH transactions. The neural network may be trained using previously attempted payment attempts. For some example implementations where the credentials are ACH numbers, training the neural network may include determining appropriate weights for a plurality of factors for the previously attempted payment attempts, such as: the bank that hosts the account; the bank's routing number; the length of the account number; one or more digits of the account number entered, such as the first, second, and third entered digits, or a final one or more entered digits of the account number; a prefix of the account number including a first n digits of the account number; a most frequent length of valid account numbers for each routing number; and so on. A target variable may be a Boolean variable corresponding to whether or not the payment attempt was successful.

In practice, failed payment attempts may be relatively rare. For example, in some implementations, roughly 1% of ACH numbers submitted may be false. Accordingly, class balancing techniques may be employed to account for this class imbalance. For example, algorithms such as synthetic minority oversampling technique (SMOTE) V1 and V2, and adaptive synthetic sampling approach for imbalanced learning (ADASYN) may be used to synthetically increase the failure events and more accurately train the neural network to predict the failed attempts.

After specifying the structure of the model and performing class balancing, the neural network may be trained. For example, several machine learning models may be trained against the target variable, where the target variable corresponds to whether or not the payment attempt is successful. The several machine learning models may include models from the trees family, such as the classification and regression trees (CART) models, random forest, and XGBoost models. The several machine learning models may also include one or more support vector machine (SVM) models. The tree models and the SVM models thus may be trained to distinguish between successful and failed payment attempts by creating the relevant branches in relevance to the features in the training set.

In some implementations, the neural network may be trained using a set of historical payment attempts, each of the historical payment attempts including one or more credentials, and a corresponding value of the decision variable, indicating whether or not the historical payment attempt was successful.

In some implementations, the neural network may be configured to benefit from the clustering of account numbers. For example, for a given bank or branch, account numbers may tend to be clustered together in groups corresponding to a range of numbers, with large gaps between such groups. This is because such account numbers are often distributed to the branches as a series of numbers starting from a fixed point which is often far from the ending point of the previous series. As more data points are gathered, for example in the training data, the more certain the model may be that a gap is in an invalid range, allowing the model to determine that the account number is likely to be invalid.

For implementations configured to benefit from the clustering of account numbers, the neural network may be trained based on a historical set of valid credentials. A specified proportion (for example, 10%, 15%, or another suitable proportion of the historical set) of the historical set of valid credentials may be set aside and designated as a test set. For each class size K between one and a maximum number of classes, the remaining valid credentials (excluding the test set) are clustered using one-dimensional k-means, and then each cluster may be evaluated with the test set. A value of K may be selected that absorbs all test points within its classes. In some implementations, selection of the value of K may also include a relaxation that a credential (e.g., an account number), may become a new lower/upper point in a class if the distance from the previous lower/upper point is a specified number of times closer to the nearest point in an adjacent class. Thus, the valid ranges may be specified as a set of {lower, upper} points of each of the classes. The neural network may thus estimate that input credentials which are within one of these valid ranges are more likely to be valid than input credentials outside of the valid ranges.

After the neural network has been trained, it is configured to determine a validity indicator corresponding to an unencrypted credential input. For example, an input ACH number may be input into the trained neural network, and a corresponding validity indicator is the output, where the validity indicator indicates whether the ACH number is likely to be valid. In some implementations, the validity indicator may represent a probability that the unencrypted credential input is valid.

As discussed above, in order to perform secure validation of encrypted credentials, the trained neural network must also be encrypted. As discussed herein, "encrypting" the neural network may include transforming each weight or parameter of a plurality of weights or parameters of the trained neural network based on the encryption protocol. For example, the encryption protocol may be a homomorphic encryption protocol, and encrypting the trained neural network may include transforming each weight or parameter of the trained neural network based on a homomorphic public key of the homomorphic encryption protocol. Homomorphic encryption may allow for the encrypted neural network to determine encrypted validity indicators which, when decrypted, correspond to the validity indicators that would be generated by the trained neural network for unencrypted credentials. Thus, the encrypted validity indicators may be determined which indicate the likelihood of validity of the unencrypted credentials without requiring access to the unencrypted credentials.

Figure 3:
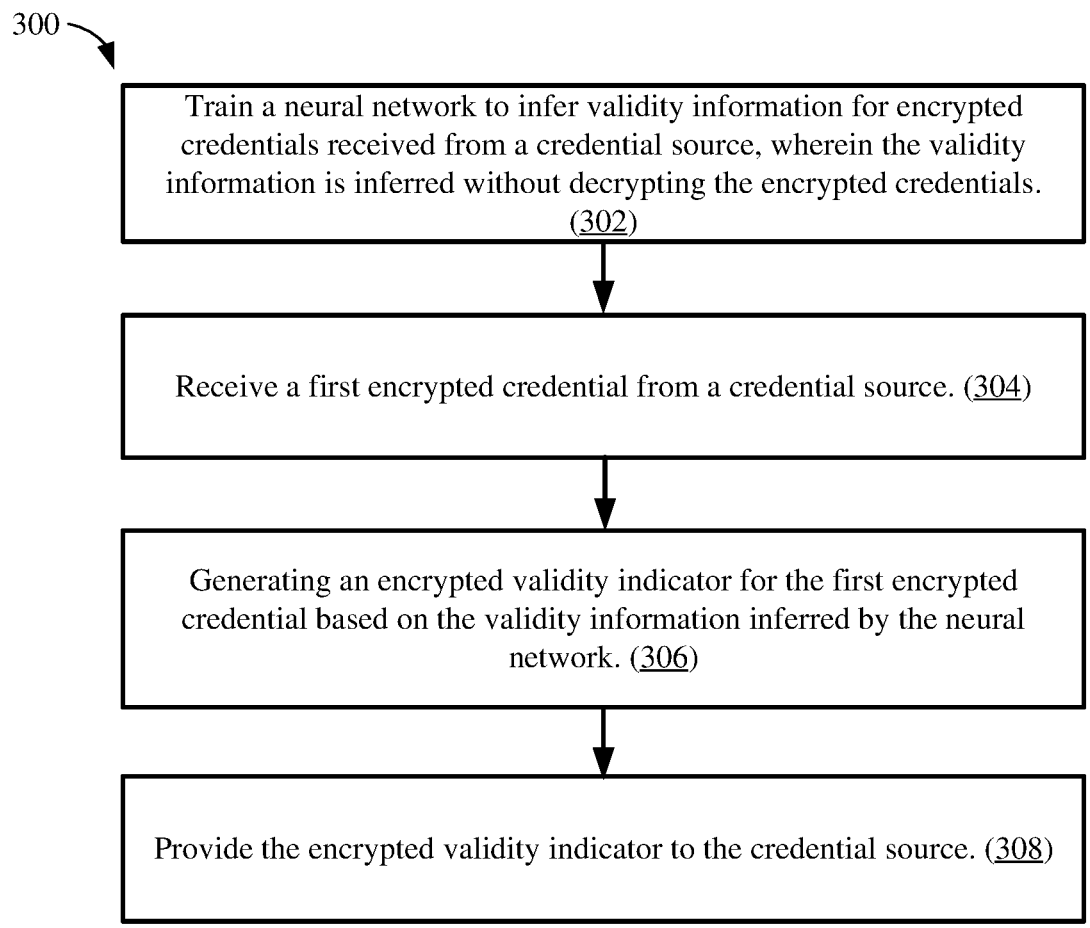
FIG. 3 shows an illustrative flow chart depicting an example operation for securely validating credentials, according to some implementations.

FIG. 3 shows an illustrative flow chart depicting an example operation 300 for securely validating credentials, according to some implementations. The example operation 300 may be performed by one or more processors of a computing device associated with a neural network. In some implementations, the example operation 300 may be performed using the secure credential validation system 100 of FIG. 1. It is to be understood that the example operation 300 may be performed by any suitable systems, computers, or servers.

At block 302, the secure credential validation system 100 receives one or more encrypted credentials from a credential source. At block 304, the secure credential validation system 100 configures the neural network to securely process encrypted credentials from the credential source. At block 306, the secure credential validation system 100 determines, using the configured neural network, an encrypted validity indicator for each of the encrypted credentials, wherein each encrypted validity indicator is determined without decrypting the respective encrypted credential. At block 308, the secure credential validation system 100 provides the encrypted validity indicators to the credential source.

In some implementations, the encrypted credentials are encrypted according to a homomorphic encryption protocol and training the neural network in block 302 includes training the neural network based at least in part on the homomorphic encryption protocol. In some implementations, training the neural network in block 302 includes transforming one or more parameters of the neural network based at least in part on a public key of the homomorphic encryption protocol.

In some implementations, training the neural network in block 302 includes determining one or more parameters of the neural network based at least in part on a plurality of unencrypted credentials, the one or more parameters training the neural network to determine an unencrypted validity indicator corresponding to an input unencrypted credential, and transforming the one or more parameters based at least in part on a public key provided by the credential source.

In some implementations, each encrypted validity indicator indicates a probability that a corresponding unencrypted credential represents a valid unencrypted credential.

In some implementations each encrypted credential corresponds to a financial account number, such as an automated clearing house (ACH) number.

Figure 4:
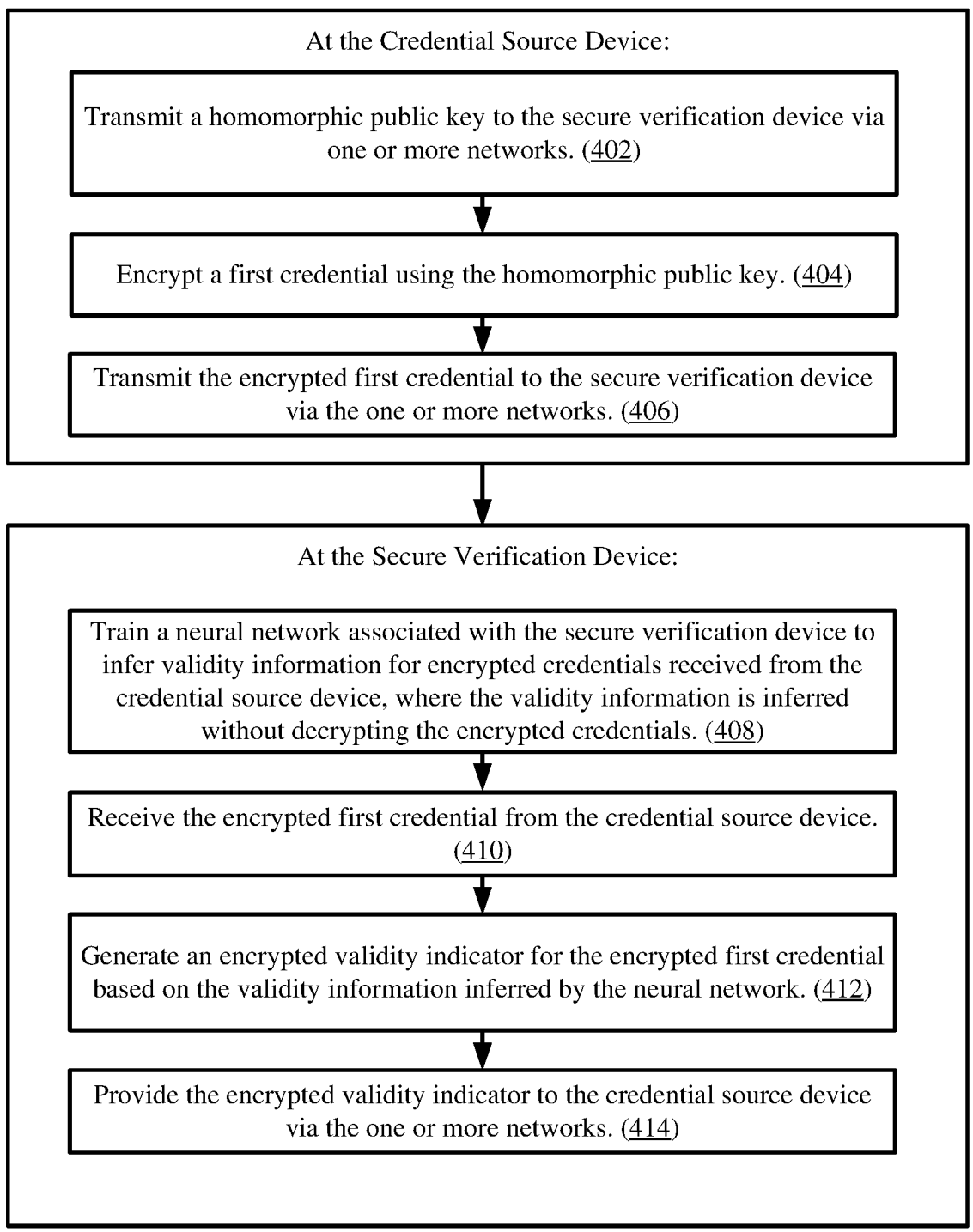
FIG. 4 shows an illustrative flow chart depicting an example operation for securely validating credentials, according to some implementations.

FIG. 4 shows an illustrative flow chart depicting an example operation 400 for securely validating credentials using a neural network. The example operation 400 may be performed by one or more processors of each of two or more computing devices. The two or more computing devices may include a credential source device and may also include a secure verification device associated with the neural network. In some implementations, secure verification device may include the secure credential validation system 100 of FIG. 1. It is to be understood that the example operation 400 may be performed by any suitable systems, computers, or servers.

The operation 400 may include steps performed at the credential source device. At block 402, the credential source device may transmit a homomorphic public key to the secure verification device via one or more networks. At block 404 the credential source device may encrypt a first credential using the homomorphic public key. At block 406 the credential source device may transmit the encrypted first credential to the secure verification device via the one or more networks.

The operation 400 may also include steps performed at the secure verification device. At block 408 the secure verification device trains a neural network associated with the secure verification device to infer validity information for encrypted credentials received from the credential source device, where the validity information is inferred without decrypting the encrypted credentials. At block 410 the secure verification device receives encrypted first credential from the credential source device. At block 412 the secure verification device generates an encrypted validity indicator for the encrypted first credential based on the validity information inferred by the neural network. At block 414 the secure verification device provides the encrypted validity indicators to the credential source device via the one or more networks.

In some implementations, training the neural network in block 408 includes determining one or more parameters of the neural network based at least in part on a plurality of unencrypted credentials, the one or more parameters training the neural network to determine an unencrypted validity indicator corresponding to an input unencrypted credential, and transforming the one or more parameters based at least in part on a public key provided by the credential source.

In some implementations each encrypted validity indicator indicates a probability that a corresponding unencrypted credential represents a valid credential.

In some implementations each credential corresponds to a financial account number such as an ACH number.

In some implementations the credential source device is further configured to receive the encrypted validity indicators from the secure verification device, decrypt the encrypted validity indicators using a homomorphic private key corresponding to the homomorphic public key, and perform one or more security functions based at least in part on the decrypted validity indicators. In some implementations, performing the one or more security functions includes determining that a credential corresponding to the decrypted validity indicator is likely to be incorrect, and prompting a user who has entered the credential to re-enter the credential.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method of securely validating credentials, the method performed by one or more processors of a computing device and comprising:
   training a neural network to infer validity information for encrypted credentials received from a credential source, the encrypted credentials encrypted according to a homomorphic encryption protocol, wherein the validity information is inferred without decrypting the encrypted credentials, and the neural network is trained based at least in part on the homomorphic encryption protocol;
   receiving a first encrypted credential from the credential source;
   generating an encrypted validity indicator for the first encrypted credential based on the validity information inferred by the neural network; and
   providing the encrypted validity indicator to the credential source.

2. The method of claim 1, wherein the training comprises:
   transforming one or more parameters of the neural network based at least in part on a public key of the homomorphic encryption protocol.

3. The method of claim 1, wherein the training comprises:
   determining one or more parameters of the neural network, based at least in part on a plurality of unencrypted credentials, the one or more parameters training the neural network to determine an unencrypted validity indicator corresponding to an input unencrypted credential; and
   transforming the one or more parameters based at least in part on a public key provided by the credential source.

4. The method of claim 1, wherein each of the encrypted validity indicators indicates a probability that a corresponding encrypted credential represents a valid unencrypted credential.

5. The method of claim 1, wherein at least some of the encrypted credentials represent financial account numbers.

6. The method of claim 5, wherein the financial account numbers include automated clearing house (ACH) numbers.

7. A system for securely validating credentials, the system comprising:
   one or more processors; and
   a memory storing instructions that, when executed by the one or more processors, causes the system to perform operations including:
   receiving a first encrypted credential from a credential source, the first encrypted credential encrypted according to a homomorphic encryption protocol;
   generating an encrypted validity indicator for the first encrypted credential based on the validity information inferred by a neural network trained to infer validity information for encrypted credentials received from the credential source without decrypting the encrypted credentials, wherein the neural network is trained based at least in part on the homomorphic encryption protocol; and
   providing the encrypted validity indicator to the credential source.

8. The system of claim 7, wherein the neural network is trained based at least in part on transforming one or more parameters of the neural network based at least in part on a public key of the homomorphic encryption protocol.

9. The system of claim 7, wherein the neural network is trained based at least in part by:
   determining one or more parameters of the neural network based at least in part on a plurality of unencrypted credentials, the one or more parameters training the neural network to determine an unencrypted validity indicator corresponding to an input unencrypted credential; and
   transforming the one or more neural network parameters based at least in part on a public key provided by the credential source.

10. The system of claim 7, wherein each encrypted validity indicator indicates a probability that a corresponding encrypted credential represents a valid unencrypted credential.

11. The system of claim 7, wherein at least some of the encrypted credentials represent financial account numbers.

12. The system of claim 11, wherein the financial account numbers include automated clearing house (ACH) numbers.

13. A system for validating credentials, the system comprising:
   a credential source device and a secure verification device, coupled together via one or more networks;
   wherein the credential source device is configured to:
   transmit a homomorphic public key to the secure verification device via the one or more networks;
   encrypt a first credential using a homomorphic private key corresponding to the homomorphic public key; and
   transmit the encrypted first credential to the secure verification device via the one or more networks; and
   wherein the secure verification device is configured to:
   train a neural network associated with the secure verification device to infer validity information for encrypted credentials received from the credential source, wherein the validity information is inferred without decrypting the encrypted credentials;
   receive the encrypted first credential from the credential source device;
   generate an encrypted validity indicator for the encrypted first credential based on validity information inferred by the neural network; and provide the encrypted validity indicator to the credential source device via the one or more networks.

14. The system of claim 13, wherein the secure verification device is to train the neural network by:

determining one or more parameters of the neural network based at least in part on a plurality of unencrypted credentials, the one or more parameters training the neural network to determine an unencrypted validity indicator corresponding to an input unencrypted credential; and transforming the one or more parameters of the neural network based at least in part on the homomorphic public key.

15. The system of claim 13, wherein each encrypted validity indicator indicates a probability that a corresponding encrypted credential represents a valid credential.

16. The system of claim 13, wherein at least some of the encrypted credentials corresponds to financial account numbers.

17. The system of claim 13, wherein the credential source device is further configured to receive the encrypted validity indicator from the secure verification device, decrypt the received encrypted validity indicator using the homomorphic private key, and perform one or more security functions based at least in part on the decrypted validity indicator.

18. The system of claim 17, wherein performing the one or more security functions comprises determining that a credential corresponding to the decrypted validity indicator is likely incorrect and prompting a user who has entered the credential to re-enter the credential.

* * * * *